United States Patent

[11] 3,552,716

| [72] | Inventor | Pieter F. Hoos<br>Greensburg, Pa. |
|---|---|---|
| [21] | Appl. No. | 830,005 |
| [22] | Filed | June 3, 1969 |
| [45] | Patented | Jan. 5, 1971 |
| [73] | Assignee | Walworth Company<br>New York, N.Y.<br>a corporation of Massachusetts |

[54] PLUG VALVE WITH A FLEXIBLE PORT PLATE
11 Claims, 10 Drawing Figs.

[52] U.S. Cl. .................................................. 251/184,
 251/317
[51] Int. Cl. ................................................... F16k 5/16
[50] Field of Search ........................................ 251/317,
 181, 184, 312

[56] References Cited
UNITED STATES PATENTS

| 262,935 | 8/1882 | Dibble .......................... | 251/317 |
| 2,110,098 | 3/1938 | Strecker ....................... | 251/184 |
| 2,208,394 | 7/1940 | Scherer ........................ | 251/312 |
| 3,108,779 | 10/1963 | Anderson ..................... | 251/317X |
| 3,326,519 | 6/1967 | Freed .......................... | 251/317 |
| 3,450,384 | 6/1969 | Watts .......................... | 251/184X |

FOREIGN PATENTS

| 1,171,525 | 10/1958 | France ......................... | 251/317 |
| 905,717 | 9/1962 | Great Britain ................ | 251/314 |

Primary Examiner—M. Cary Nelson
Assistant Examiner—Michael O. Sturm
Attorney—Melvin R. Stidham ABSTRACT: A tapered plug valve with thin flexible plates of metal or the like to seal against the plug, the plates being restrained against lateral or circumferential movement in the valve body by means of axial extensions inserted in the flow ports. A backing liner of elastomeric material seals the flexible port plates to the body and enables them to conform to the curvature of the tapered plug. A top closure with self-adjusting plug loading comprises a Belleville spring which is pressed by a loading ring against the top shoulder of the plug. Any leakage past the upstream port plate seal causes a pressure buildup in the valve housing which exerts an additional torsional force on the Belleville spring about the load ring to increase axial plug load until the upstream port is again sealed.

INVENTOR.
PIETER F. HOOS
BY Melvin R. Stidham
ATTORNEY

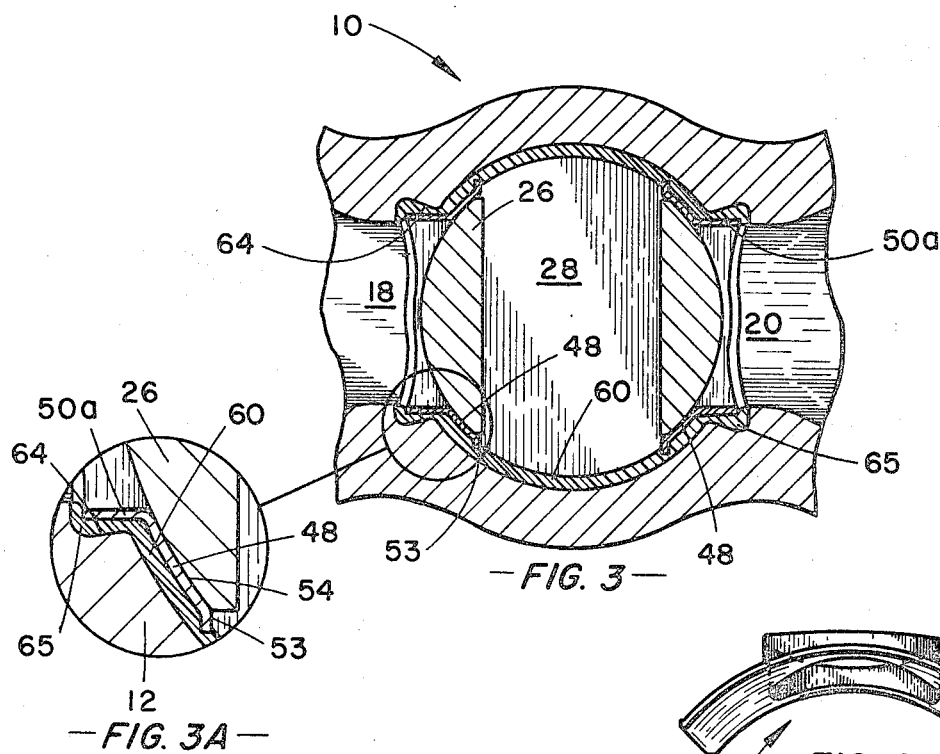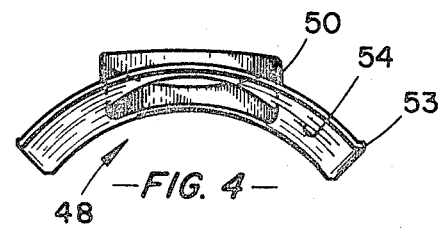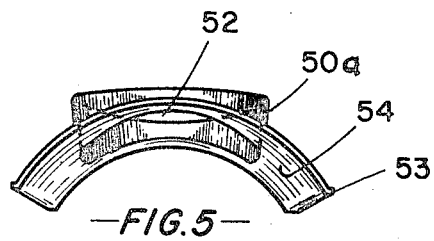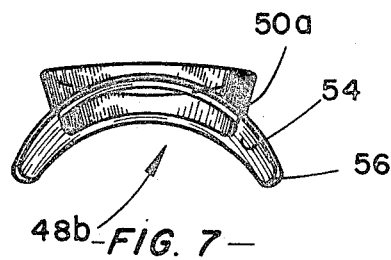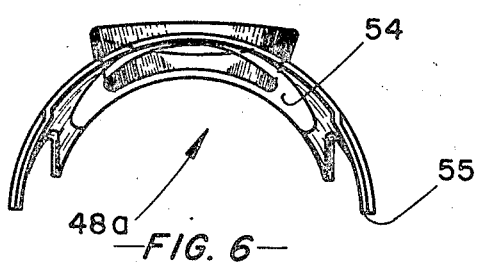

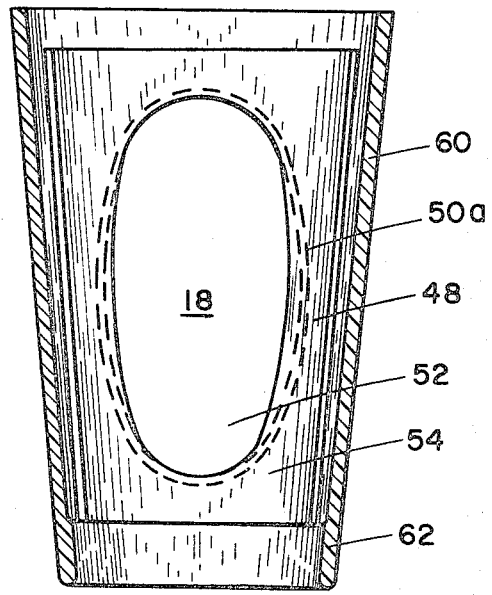
—FIG. 8—
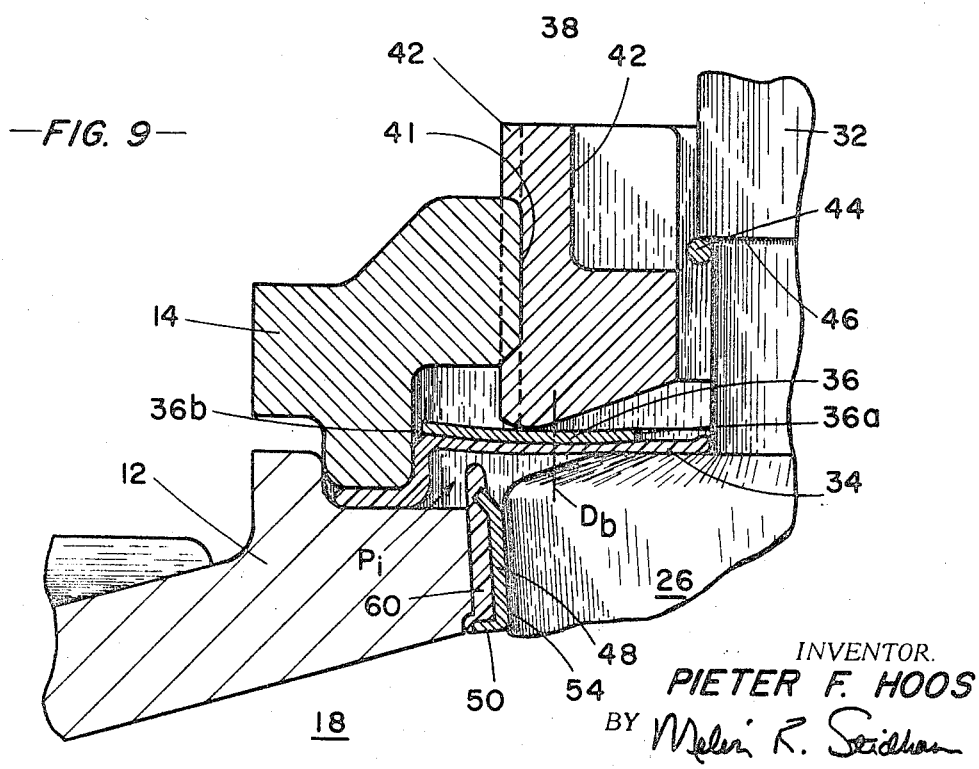
—FIG. 9—
INVENTOR.
PIETER F. HOOS
BY Melvin R. Seidham
ATTORNEY

PLUG VALVE WITH A FLEXIBLE PORT PLATE

BACKGROUND OF THE INVENTION

This invention relates to a plug valve with a flexible port plate and, more particularly, to a plug valve utilizing flexible port plates and, more particularly, to a plug utilizing flexible port plates to seal around the ports and against the plug, the valve body being lined with a resilient member to back up the flexible port plates and accommodate flexural movements thereof.

Conventional tapered plug valves improve the integrity of the port seals by adjustment of the axial loading on the plug, thereby wedging the plug against the seating surfaces on the valve housing. This wedging action greatly increases the valve operating torque and, generally, some lubricant is provided to facilitate rotation of the plug and to function as the sealing medium when the valve is closed. In conventional lubricated plug valves, the lubricant is replenished through suitable fittings on the body, and/or the plug. With the advent of plastics with low coefficients of friction, such as polytetrafluoroethylene, which is sold under the trademark "Teflon," there has evolved a so-called "nonlubricated plug valve," wherein sleeves or rings of such material are permanently retained on either the plug or the body while the opposing member is smoothly finished to aid relative sliding movement.

In addition to its function as a lubricant, the low friction material usually constitutes the valve seal means. Therefore, the material must adhere or conform to the surface on which it is carried so that there is no leakage path behind it. Because Teflon does not have adhesive qualities, it has to be locked to the surface, either by mechanical means, such as through the provision of lands or grooves over which the Teflon cold flows, or by chemical transformation of the surface into an adhering or bonding structure. In addition, where Teflon sleeves are employed as the lubricating and sealing member, they must have sufficient strength to resist any tendency to peel away from the surface under action of the fluid stream. This normally requires a Teflon sleeve that is extremely bulky and much thicker than desirable to perform the functions for which it is selected.

Also in tapered plug valves, the seals are dependent upon axial loading of the plug. This loading is generally determined by threaded adjustment means provided in the top closure member. However, if the seals take a permanent set, as frequently happens, the plug may no longer be firmly wedged, rendering the seal ineffective. At best, this requires adjustment of the top closure in valves wherein this is contemplated.

Accordingly, it is an object of this invention to provide an improved rotary plug valve with yieldable seal means restrained in the body and adapted to conform to the curvature of the plug irrespective of the axial penetration of the plug.

It is a further object of this invention to provide a plug valve with port plates having characteristics of resilience and low coefficient of friction without requiring excessive bulk to achieve strength.

It is a further object of this invention to provide a rotary plug valve with a thin semirigid seal plate to seal against the plug, and a relatively thin elastomeric backing member to seal between the plate and the body.

It is a further object of this invention to provide a rotary plug valve with self-adjusting means for regulating the axial load on the plug to maintain integrity of the main seals.

It is a further object of this invention to provide a rotary plug valve with self-adjusting means for regulating the axial load on the plug, the range of adjustment being of sufficient magnitude to function as a secondary top seal in the event the resilient top seal is destroyed.

It is a further object of this invention to provide a rotary plug valve with a seal plate to seal against the plug and a resilient liner to seal between the plate and housing with the plate being adapted to function as a secondary seal in the event the liner is destroyed.

SUMMARY OF THE INVENTION

In accordance with a preferred embodiment of this invention, I provide in a plug valve having a tapered body cavity a thin liner of elastomeric, low friction plastic to back thin port plates of strong material. The port plates are provided around their port openings with a thin coating, preferably sprayed, of a material which is suitable as a sealing and lubricating medium. The seal plates are restrained in place within the housing as by means of axial extensions thereon which are carried in the flow ports. When the tapered plug is wedged down into the body cavity, the port plates adapt themselves to conform to the curvature of the plug without regard to the extent of plug penetration axially, the resilient liner yielding to enable this conformation.

A diaphragm of resilient material seals off the top opening in the valve body, being clamped at its outer diameter between the body and the top closure to provide a static seal. At its inner diameter, the diaphragm is clamped between the top shoulder of the plug and a Belleville spring to provide a variable, or dynamic seal, with any axial movement of the plug being followed by the spring-loaded diaphragm.

Fluid pressure inside the valve body will force the resilient diaphragm against the full area of the flat Belleville spring which is supported by an axial adjustable loading ring in the top closure on a circle of a radius intermediate that of the inner and outer edges of the spring. That is, the spring is supported on a circle approximately midway of its width so that the greater area outside the loading or bearing circle insures that any pressure acting against the Belleville spring will create a net force and, hence, a couple about the bearing circle to increase the axial load applied at the inner diameter against the top of the plug. Therefore, if the upstream seal should leak when the valve is closed, there will result a pressure buildup within the body, and the pressure buildup will, in turn, create the couple just described to increase the axial load on the plug until the integrity of the upstream seal is again established.

Other objects and advantages of this invention will become apparent from the more detailed description following when read in conjunction with the accompanying drawing.

BRIEF DESCRIPTION OF THE DRAWING

FIG. 3 is a horizontal section view taken along line 3–3 of FIG. 2;

FIG. 3A is an enlarged partial section view taken from FIG. 3;

FIGS. 4 and 5 are top views of a port plate forming a feature of this invention;

FIGS. 6 and 7 are top views of other port plate embodiments;

FIG. 8 is a vertical section view of the sleeve liner and seal plate subassembly; and FIG. 9 is an enlarged partial section of the plug top seal.

DESCRIPTION OF THE PREFERRED EMBODIMENTS

Figure 1:
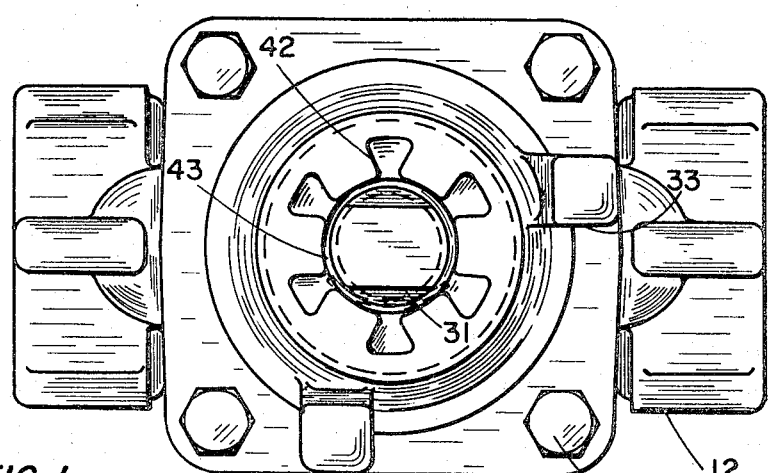
FIG. 1 is a top plan view of a plug valve embodying features of this invention.
Figure 2:
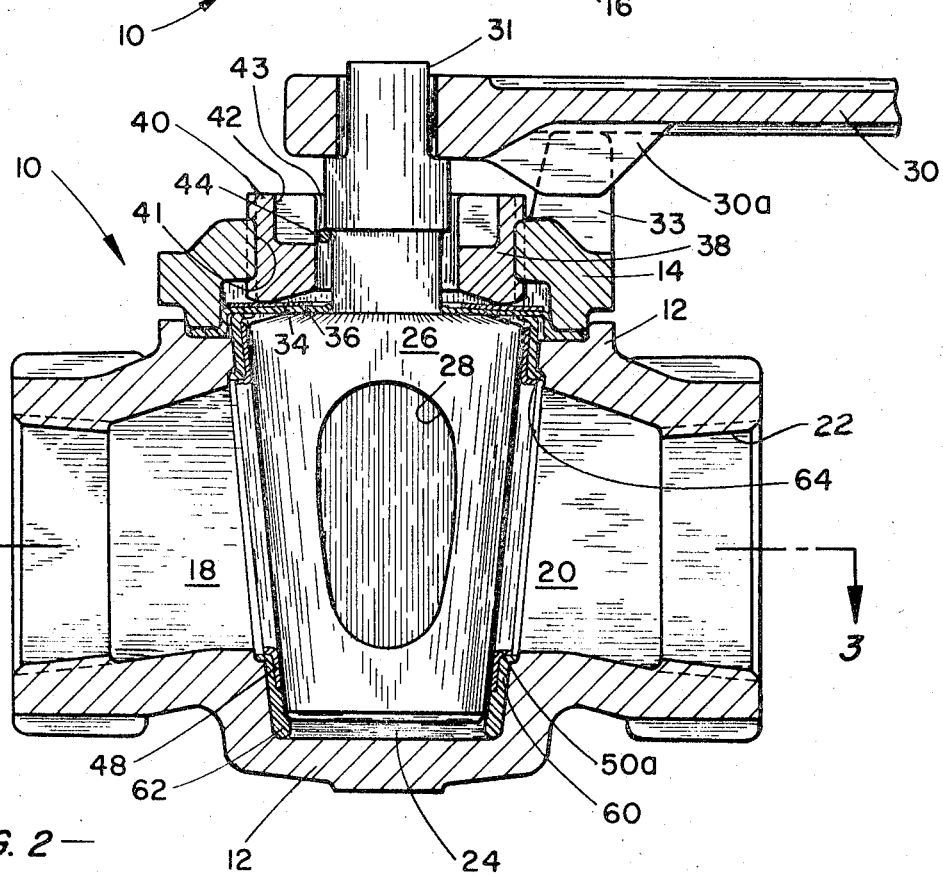
FIG. 2 is a vertical section view of the plug valve of FIG. 1.

Referring now more particularly to FIGS. 1 and 2, the plug valve 10 of this invention comprises a body 12 and top closure 14 secured to the body, as by means of cap screws 16. The body 12 is cast or otherwise formed with inlet and outlet flow passages or ports 18 and 20, the outer ends of which may be threaded, flanged or otherwise adapted at 22 for connection into a pipeline. Intersecting the flow passages 18 and 20, with its axis disposed transversely thereto is a body cavity 24 which as shown is preferably of tapered or frustoconical configuration to accommodate a complementary, rotatable valve plug 26. The plug 26 is formed with a flow passageway 28 therethrough, so that by rotating the plug through 90° the plug passageway 28 is moved into and out of alignment with the flow ports 18 and 20 to open or close the ports to fluid flow.

Rotation of the plug may be accomplished by any suitable means, such as the handle 30 which engages a flat portion 31 or otherwise grips the upper stem portion 32 of the plug 26. Stops 33 on the top closure 14 are engageable by complementary protuberances 30a on the handle 30 to define the open and closed positions of the plug 26.

A seal is provided at the upper end of the body 12 by means of a resilient diaphragm 34 which has its outer portion clamped between the body 12 and the closure 14, and its inner portion clamped between the top shoulder of the plug 26 and a Belleville spring 36. The Belleville spring 36 is pressed firmly against the plug 26 by an adjustable loading ring 38 which is threaded at 40 into the central opening 41 of the closure 14. Suitable means, such as arcuately spaced depressions 42, are provided to receive a suitable tool (not shown) for threading the adjustable loading ring 38 downward. A clearance 43 is preferably provided around the plug stem to permit limited movement of the plug in the direction of fluid flow under circumstances hereinafter to be described. Because this clearance places the plug in electrical isolation from the valve body, a spark arrestor 44 of spring wire or the like is bent within its elastic limits and inserted between the stem and pressure ring as by seating against a shoulder 46 around the valve stem 32, in order to connect the plug electrically to the valve housing.

The bonnet loading ring 38 engages the Belleville spring 36 around a circle $D_b$ (FIG. 9) located approximately halfway between its inner and outer circumferential edges 36a and 36b so that a greater area of the Belleville spring 36 is located on the outside of this bearing circle $D_b$ to be exposed to internal pressure $P_i$. That is, since by the Rule of Guldin, an annular area is proportional to its average diameter, the annular area outside of the bearing circle $D_b$ is greater than the annular area within the circle $D_b$. Therefore, any pressure buildup within the body will act on a larger area outside of the bearing circle $D_b$ and, therefore, exert a greater load through the resilient diaphragm and against the Belleville washer on the outside of the bearing circle $D_b$ than on the inside. Hence, an increase in pressure will create a couple about the bearing or support diameter $D_b$ which will twist the Belleville spring inward and increase the axial loading on the plug. In the case of a tapered plug, as illustrated here, the axial loading on the plug affects the seal around the flow passages. Therefore, if the axial load on the plug is not great enough to seal off the upstream flow passage 18, the leakage into the valve body will increase the pressure loading $P_i$ on the Belleville spring 36, creating the couple just described to, in turn, increase the axial load on the plug 26 and seal off the upstream passage 18.

Hence, the top seal around the plug is self-compensating and the seal can adjust itself just to the pressure level required. Therefore, the initial pressure asserted by the loading ring 38 may be set relatively low so that required operating torque will not be excessive.

In the event the diaphragm 34 is destroyed as by burning or by some unforeseen mechanical or chemical action, the Belleville washer will twist to engage the plug directly and provide a metal-to-metal seal which will prevent, or at least minimize, leakage to the outside.

The inlet and outlet valve seals are achieved by means of port plates 48 (FIGS. 4 and 5), which may be formed from metal plate in a press with an axial extension 50 extruded around an opening 52 conforming to the flow ports 18 and 20. When formed, the port plate 48 is of the general configuration shown in FIG. 4, wherein the plug is curved on a fairly large radius with the sidewalls of the port extension 50 extending substantially parallel to the axis of the port 52. In addition, the side edges of the plate are curled back at 53 to prevent interference with rotation of the plug, and to retain the elastomeric liner between the port plate and the body proper. Then, when the seal plates 48 are inserted into the body cavity 24 with the plate extensions 50 extending into the valve ports 18 and 20, the valve plug 26 is forced down into the body cavity so that the plates are adapted to the curvature of the plug, whereby they assume a curvature along a smaller radius causing the sidewalls of the port extension to flare outward as shown at 50a in FIG. 5, for a purpose to be described. Preferably, the port plate is coated at 54 to provide a sealing medium adapted to engage and seal against the valve plug. A particularly suitable material for the sealing and bearing coating is polytetrafluoroethylene sold under the trademark "Teflon." Preferably, the Teflon is applied by spraying to a coating thickness of about 0.002" to 0.004". Thus, there is achieved a rigid bearing member providing strong support for the plug 26.

Referring now to FIGS. 6 and 7, the port plate may take other forms within the scope of this invention. For example, the plate 48a has winglike side extension 55 to provide greater support for side loads on the plug as occasioned when turning the handle 30. Alternatively, the plate 48b (FIGS. 7 and 8) is of generally oval configuration 56 to surround the flow port 18 and 20.

Interposed between the port plate and the valve body is a sleeve 60 of resilient material, preferably formed with relatively thin walls throughout most of its axial length, although it may be provided with a thicker circumferential bearing band 62 (FIG. 8) around the bottom. The sleeve 60, if made of Teflon, provides a chemically inert, resilient lining for the valve body cavity and backup support for the port plates. In addition, where it is engaged by the plug, it provides an excellent bearing surface because of its characteristic low coefficient of friction. With the port plates 48 in place as shown in FIG. 3, the outwardly flared sidewalls of the port extension 50a force the Teflon sleeve back into outwardly tapered recesses 64 surrounding the ports 18 and 20 to deflect it out of the path of fluid flowing through the inlet port 18 thereby to prevent fluid impacting upon the sleeve and port plate. The outwardly curled side edges 53 of the plates press against the resilient sleeve 60 and thereby entrap that portion of the sleeve between the curled lips 53 and outer edges of the port extensions 50a. In addition, the outward curling of the edges 53 prevents interference with the rotational movement of the valve plug 26.

The elastomeric liner 60 provides a resilient base for the port plates 48 so that they can conform to the curvature of the plug 26, depending upon the depth to which the plug is forced into the body cavity to achieve the desired axial loading previously described. A portion of the elastomeric sleeve around the flow ports is bent by the port plate extensions 50a into a wedge-shaped area 65 between the port extension 50a and the more sharply tapered recesses 64 around the flow ports 18 and 20. Fluid pressure acting on the elastomeric sleeve material will force this material farther into this wedge-shaped area and, in doing so, improves the sealing performance.

When the valve plug 26 is forced downward as shown in FIG. 2, it forces the port plates 48 to assume its own curvature, and it rides firmly on the thick lower circumferential band 62 of the sleeve 60. This band provides a bottom, low friction bearing and, at the same time, a lower resilient seal around the valve plug. Preferably, the diameter of this seal is approximately the same as the sealing diameter of the top Belleville spring so that the plug is substantially in hydrostatic balance.

In the event the liner 60 is destroyed, as by burning or by some unforeseen chemical reaction, the clearance 43 around the plug stem will enable the plug to move downstream and push the downstream port plate until the edge of the port extension 50a bottoms in the recess 64 to form a secondary seal and close off, or at least minimize leakage to the downstream port 18 or 20.

While this invention has been described in conjunction with a preferred embodiment thereof, it is obvious that modifications and changes therein may be made by those skilled in the art within the spirit and scope of this invention.

I claim:
1. A plug valve comprising:
   a valve body having inlet and outlet flow ports and a body cavity disposed transversely of said ports;

a plug in said body cavity having a flow passageway therethrough;

at least one arcuate flexible seal plate of thin, strength material mounted in said body with an opening therein aligned with one of said flow ports to seal against said plug around said one flow port;

a closed axial extension from the outer surface of said seal plate completely around the opening therein extending outward into said one flow port to restrain said plate against lateral motion;

an axially extending recess in the wall of said body cavity around said one flow port accommodating said axial extension, the sides of said recess being tapered outward away from said body cavity;

a thin sheet of elastomeric material interposed to seal between said seal plate and the wall of said body cavity and to accommodate flexural movements of said seal plate;

portions of said thin sheet around said flow port extending into said axial recess and around the edge of said axial seal plate extension to seal between said extension and the wall of said recess.

2. The plug valve defined by claim 1, wherein; said plug is free to move a limited amount in the direction of fluid flow in absence of said thin sheet, the edge of said axial extension being adapted to engage and seal around the bottom of said recess in the event of said movement.

3. The plug valve defined by claim 1, wherein; the lateral edges of said seal plate are curled radially outward into firm locking engagement with said resilient sheet.

4. The plug valve defined by claim 1, including; a thin coating of resilient material sprayed on the inner surface of said port plate around the port therein.

5. The plug valve defined by claim 1, including; a thin coating on areas of the inner surface of said seal plate of a material having a low coefficient of friction.

6. The plug valve defined by claim 1, wherein said plug and body cavity are of complementary tapered configuration and including:

a closure member secured to said valve body to cover said body cavity;

a resilient diaphragm covered by said closure member and sealed around its outer edges to said valve body;

a Belleville spring interposed between said diaphragm and said closure member;

a loading ring acting approximately coaxial with and against said Belleville spring on a circle approximately midway between the inner and outer diameter thereof; and means connecting said loading ring and said closure member to force said loading ring against said Belleville spring and adjust the axial load on said plug with the inner circumferential edge of said Belleville spring firmly engaging said diaphragm.

7. The valve plug defined by claim 1 wherein:

said plug and said body cavity are of complementary frustoconical configuration; and said seal plate when undeformed is on a conical surface of greater radii than radii of said plug at corresponding axial locations, whereby placement of said plate and plug deforms said plate to smaller radii and deforms lateral portions of said axial extension outward.

8. The plug valve defined by claim 1 including: lateral winglike extensions on said seal plate.

9. A plug valve comprising:

a valve body having inlet and outlet flow ports;

a tapered body cavity in said valve body transverse of said flow ports, a complementary tapered plug received in said body cavity;

complementary sealing surfaces on said plug and on the wall of said body cavity;

a closure member secured to said valve body to cover said body cavity;

means sealing between said closure member and said valve body;

a Belleville spring disposed between said closure member and said plug;

a loading ring acting approximately coaxial with and against said Belleville spring on a circle approximately midway between the inner and outer diameter thereof; and means connecting said loading ring and said closure member to force said loading ring against said Belleville spring and adjust the axial load on said plug with the inner circumferential edge of said Belleville spring firmly pressing said plug.

10. The plug valve defined by claim 9, wherein said sealing means comprises:

a resilient diaphragm sealing around its outer edges between said closure member and said valve body; and inner portions of said diaphragm being interposed between said Belleville spring and said plug to seal therebetween.

11. The plug valve defined by claim 10, wherein; said Belleville spring provides full support for that portion of the resilient diaphragm which is not supported by said closure member.